(12) United States Patent
Knowles

(10) Patent No.: US 10,939,402 B2
(45) Date of Patent: *Mar. 2, 2021

(54) HIGH DEFINITION TIMING SYNCHRONISATION FUNCTION

(71) Applicant: Imagination Technologies Limited, Kings Langley (GB)

(72) Inventor: Ian Knowles, Buckinghamshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/416,558

(22) Filed: May 20, 2019

(65) Prior Publication Data

US 2019/0274109 A1  Sep. 5, 2019

Related U.S. Application Data

(63) Continuation of application No. 14/667,162, filed on Mar. 24, 2015, now Pat. No. 10,334,551.

(30) Foreign Application Priority Data

Mar. 24, 2014 (GB) .................................. 1405193.2

(51) Int. Cl.
*H04W 56/00* (2009.01)
*H04J 3/06* (2006.01)
(Continued)

(52) U.S. Cl.
CPC ......... *H04W 56/0065* (2013.01); *H04J 3/067* (2013.01); *H04L 43/106* (2013.01);
(Continued)

(58) Field of Classification Search
CPC ......... H04W 56/0065; H04W 72/0446; H04W 56/0085; H04W 56/0015; H04J 3/067; H04L 43/106; H04L 69/22
See application file for complete search history.

(56) References Cited

U.S. PATENT DOCUMENTS 8,943,352 B1  1/2015  Warneke
2005/0169233 A1  8/2005  Kandala et al.
(Continued)

FOREIGN PATENT DOCUMENTS

CN  102057596 A  5/2011
CN  102783078 A  11/2012
(Continued)

*Primary Examiner* — Feben Haile
(74) *Attorney, Agent, or Firm* — Potomac Law Group, PLLC; Vincent M DeLuca

(57) ABSTRACT

A high definition timing synchronization function is described. In an embodiment, a wireless station generates a time stamp at a higher resolution than can be broadcast within a standard time stamp field in a frame. The generated time stamp is divided into two parts: the first part being included within the time stamp field and the second part being included within a vendor specific field in the same frame. The frame is transmitted by the wireless station and received by other wireless stations in the wireless network. If the receiving wireless station has the capability, it decodes both the time stamp field and the vendor specific field and recreates the higher resolution time stamp. This higher resolution time stamp is then used to synchronize the receiving wireless station and the transmitting wireless station by resetting a clock or by storing time stamps and corresponding clock values.

20 Claims, 11 Drawing Sheets

(51) Int. Cl.
*H04L 12/26* (2006.01)
*H04L 29/06* (2006.01)
*H04W 72/04* (2009.01)

(52) U.S. Cl.
CPC ......... *H04L 69/22* (2013.01); *H04W 56/0015* (2013.01); *H04W 56/0085* (2013.01); *H04W 72/0446* (2013.01)

(56) References Cited

U.S. PATENT DOCUMENTS

| | | |
|---|---|---|
| 2007/0116129 A1 | 5/2007 | Kim et al. |
| 2008/0025344 A1 | 1/2008 | Biederman et al. |
| 2011/0006818 A1 | 1/2011 | Takagi et al. |
| 2011/0216660 A1 | 9/2011 | Lee et al. |
| 2012/0127831 A1 | 5/2012 | Gicklhom et al. |
| 2013/0307509 A1 | 11/2013 | Henzler |

FOREIGN PATENT DOCUMENTS

| | | |
|---|---|---|
| JP | 2010-50761 A | 3/2010 |
| WO | 2013/041829 A1 | 3/2013 |

HIGH DEFINITION TIMING SYNCHRONISATION FUNCTION

BACKGROUND

The Wi-Fi™ standard describes a number of different types of management frames. One type is a beacon frame which is used to announce the existence of a network. Beacon frames are transmitted at regular intervals to allow Wi-Fi™ stations to find and identify a network. Beacon frames include a timing synchronization function (TSF) time stamp which is used by receiving wireless stations (STAs) to update a local free running clock.

There are many reasons why time synchronization between Wi-Fi™ stations, or more particularly, synchronization between their local clocks, is important. For example where the Wi-Fi™ network is being used to stream media (e.g. audio or video data) the clocks are used to control play back of the received media. If the local clocks in each of a pair of loudspeakers playing the same music track (e.g. in a multi-room music system) are not synchronized (where each speaker is a separate Wi-Fi™ station), the audio from each speaker will not be synchronized and as the clocks diverge (as one runs faster than the other), this will become audible to a listener. Where the pair of loudspeakers operates as a stereo pair, with one playing a left channel of an audio signal and the other playing a right channel of the same audio signal, the two must be even more accurately synchronized or this will be apparent to a listener and affect their listening experience.

The embodiments described below are not limited to implementations which solve any or all of the disadvantages of known methods of synchronizing Wi-Fi™ stations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A high definition timing synchronization function is described. In an embodiment, a wireless station generates a time stamp at a higher resolution than can be broadcast within a standard time stamp field in a frame. The generated time stamp is divided into two parts: the first part being included within the time stamp field and the second part being included within a vendor specific field in the same frame. The frame is transmitted by the wireless station and received by other wireless stations in the wireless network. If the receiving wireless station has the capability, it decodes both the time stamp field and the vendor specific field and recreates the higher resolution time stamp. This higher resolution time stamp is then used to synchronize the receiving wireless station and the transmitting wireless station by resetting a clock or by storing time stamps and corresponding clock values.

A first aspect provides a method of operation of a wireless station, the method comprising: generating a high resolution time stamp; dividing the generated time stamp into two parts, the first part comprising a time stamp at a lower resolution than the generated time stamp and the second part comprising one or more remaining bits of the generated time stamp; inserting the first part into a time stamp field within a frame; inserting the second part into a vendor specific field within a frame; and transmitting the one or two frames comprising the time stamp field and the vendor specific field.

A second aspect provides a method of operation of a wireless station, the method comprising: receiving one or two frames comprising a time stamp field and a vendor specific field; decoding the time stamp field to extract a first part of a time stamp; decoding the vendor specific field to extract a second part of the time stamp; combining the first and second parts to create a high resolution time stamp; and using the high resolution time stamp to synchronize the wireless station with other wireless stations in a wireless network.

A third aspect provides a wireless station comprising: a clock operating at a frequency above 1 MHz; a time stamp generation module arranged to generate a high resolution time stamp using the clock and to divide the generated time stamp into two parts, the first part comprising a time stamp at a lower resolution than the generated time stamp and the second part comprising one or more remaining bits of the generated time stamp; a frame generator module arranged to insert the first part into a time stamp field within a frame and the second part into a vendor specific field within a frame; and a wireless transmitter arranged to transmit the one or two frames comprising the time stamp field and the vendor specific field.

A fourth aspect provides a wireless station comprising: a decoder arranged to decode a time stamp field of a received frame to extract a first part of a time stamp and a vendor specific field of a received frame to extract a second part of the time stamp and to combine the first and second parts to create a high resolution time stamp; at least one of a local oscillator and a system clock; a counter linked to one of the local oscillator and the system clock and arranged to increment based on the linked local oscillator or system clock; and logic arranged to use the high resolution time stamp to synchronize the wireless station with other wireless stations in a wireless network.

A fifth aspect provides a computer readable storage medium having encoded thereon computer readable program code for generating a processor configured to perform a method as described herein.

A sixth aspect provides a computer readable storage medium having encoded thereon computer readable program code for generating a processor comprising: a time stamp generation module arranged to generate a high resolution time stamp using the clock and to divide the generated time stamp into two parts, the first part comprising a time stamp at a lower resolution than the generated time stamp and the second part comprising one or more remaining bits of the generated time stamp; and a frame generator module arranged to insert the first part into a time stamp field within a frame and the second part into a vendor specific field within a frame.

A seventh aspect provides a computer readable storage medium having encoded thereon computer readable program code for generating a processor comprising: a decoder arranged to decode a time stamp field of a received frame to extract a first part of a time stamp and a vendor specific field of a received frame to extract a second part of the time stamp and to combine the first and second parts to create a high resolution time stamp; and logic arranged to use the high resolution time stamp to synchronize a wireless station with other wireless stations in a wireless network.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
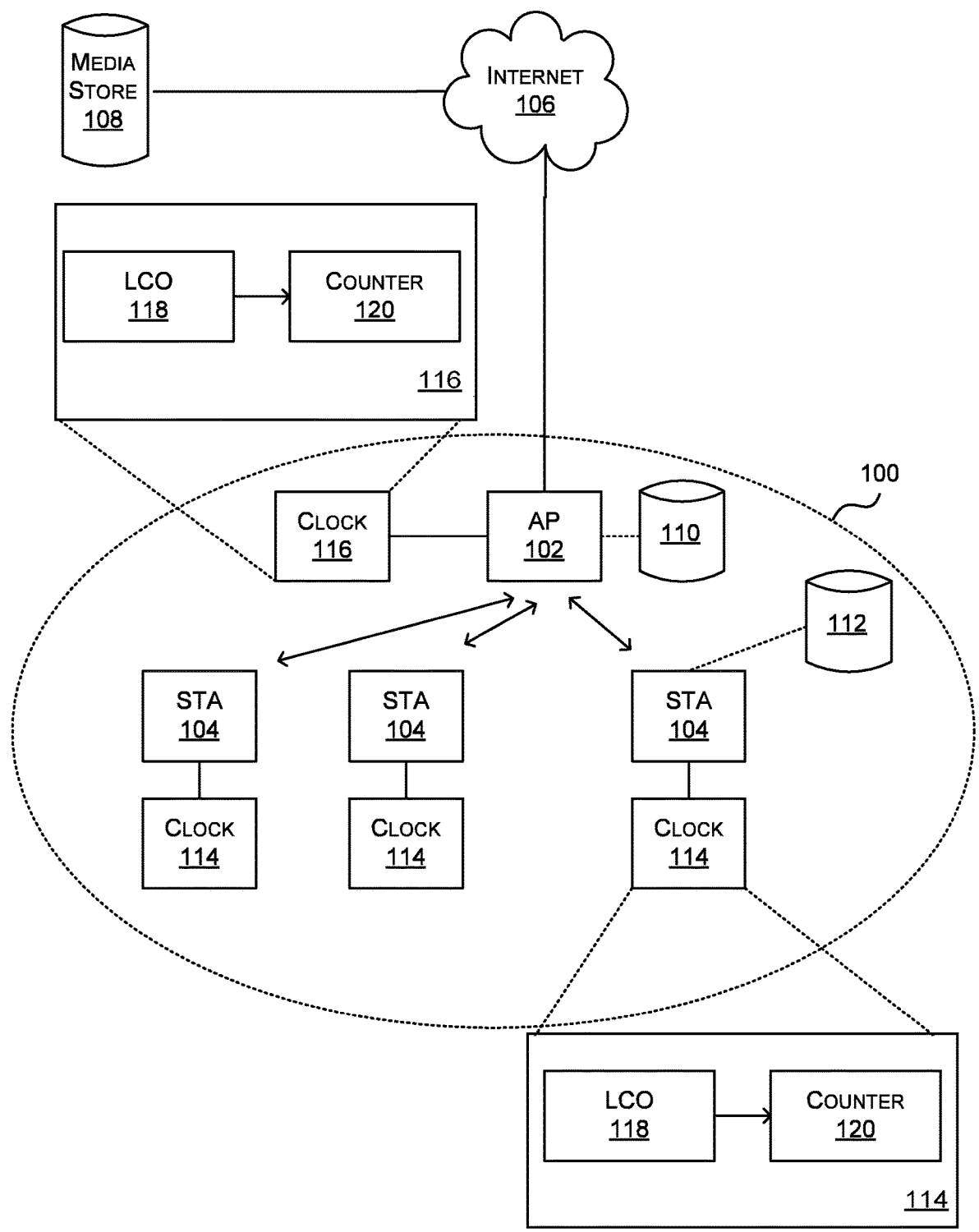
FIG. 1 is a schematic diagram showing a wireless network.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Methods and systems for accurately synchronizing wireless stations in a wireless network are described. A time stamp is generated at a broadcasting wireless station (e.g. a wireless access point (AP)) which is at a higher resolution (e.g. by 3 or 6 orders of magnitude) than can be transmitted in a standard time stamp field within a frame, such as a beacon frame, broadcast by the wireless station to other wireless stations in a wireless network. The transmitting wireless station (e.g. the AP) divides the generated time stamp into two parts and inserts a first part into the standard time stamp field. This first part of the generated time stamp comprises the most significant bits of the time stamp and hence provides a time stamp at a lower resolution than the generated time stamp. The second part is the remainder of the generated time stamp (e.g. the least significant bits omitted from the first part). This second part is inserted into a vendor specific field within the frame.

By dividing the generated, high resolution (or high definition) time stamp in this way for transmission to other wireless stations in the network, the system remains compliant with the standard defining the frame structure (and in particular the characteristics of the time stamp field within the frame) and is backwards compatible. Any wireless station that is not able to interpret the new time stamp information inserted in the vendor specific field can still synchronize its local clock and continue to operate, using the standard time stamp field and standard synchronization mechanism, whilst any wireless station that is capable of interpreting the new time stamp information, can synchronize itself to the transmitting wireless station to a higher level of accuracy (e.g. to nanosecond or picosecond accuracy rather than microsecond accuracy).

The higher level of accuracy which can be achieved using the methods described herein may be beneficial for many different applications, such as high quality audio systems (e.g. for wireless stereo speaker pairs) and video systems (e.g. to aid the jitter requirements which may require a timing accuracy of 500 ns or better). In addition to media systems, it may also be beneficial in any other application that requires devices to maintain a high degree of synchronization, such as process control, manufacturing, or scientific instrumentation.

The term "Wi-Fi™ network" is used herein to mean a wireless local area network that is based on the Institute of Electrical and Electronics Engineers (IEEE) 802.11 standards. The term "Wi-Fi™ station" is used herein to mean an electronic device that has a Wi-Fi™ module that allows the device to exchange data wirelessly using the IEEE 802.11 standards. The term "Wi-Fi™ access point" is used herein to mean an electronic device that acts as a central transmitter and receiver of W-Fi™ signals as set out in the IEEE 802.11 standards.

Although the methods and systems are described herein as being used in a Wi-Fi™ network, it will be appreciated that the methods may also be applied in other wireless networks which use some form of synchronization and which operate to a standard other than IEEE 802.11.

FIG. 1 is a schematic diagram showing a wireless network 100, which may be a Wi-Fi™ network. The network 100 comprises an access point (AP) 102 which is a wireless device that generates and broadcasts time stamps which are received by wireless stations (STAs) 104 within the network 100 and used to synchronize local clocks 114 (i.e. clocks at the receiving STAs 104). In various examples, the time stamps are communicated within a beacon frame. The AP 102 may be connected (e.g. via a wired connection) to the internet 106 or to any other network (e.g. a corporate network). The wireless network 100 may be used to stream media (e.g. audio or video streams) to the STAs 104 and the media may be stored on a database 108 which is accessible via the internet 106 or on a database 110, 112 within the network 100. Where the database is within the network 100, it may be connected to the AP 102 (database 110) or it may be connected to one of the STAs 104 within the network 100 (database 112).

The access point 102 and the wireless stations 104 within the wireless network 100 may be computing-based devices such as desktop computers, laptop computers, tablet computers, smart phones, digital radio, smart TV, games consoles, media players, etc. In some examples a wireless station 104 may be capable as functioning as an AP and so the AP 102 may be a wireless station 104 which is currently acting as AP (e.g. a master node in a Wi-Fi™ system which is acting as AP). In other examples, the AP 102 may be a dedicated wireless networking device that acts as an AP and may include additional networking functionality (e.g. it may also act as a router) but may not be capable of more general or non-networking functions. In various examples, the AP 102 and/or a wireless station 104 may be a wireless speaker.

As described in UK Patent GB2494949, each STA 104 comprises a physical layer clock 114 and the AP 102 also comprises a physical layer clock 116. Each of the clocks 114, 116 are free running clocks and comprise a free running oscillator (e.g. local crystal oscillator (LCO) 118) and a counter 120 which is arranged to increment at each clock "tick" or clock cycle, such that the counter value is the clock value (although in other examples, the counter may increment in another way based on the clock cycle). In Wi-Fi™ systems, the counter 120 runs at 1 MHz and so a 1 MHz LCO 118 may be used. It will be appreciated that instead of using a physical 1 MHz oscillator, a phase locked loop (PLL) or similar divider/multiplier methods may be used. Any reference to an LCO in the following description is by way of example only and other sources of a clock tick may alternatively be used.

Although the intention is that the oscillator 118 in each wireless station 104 should produce a clock signal (e.g. a clock tick) with the same frequency as the free running oscillator 118 in the AP 102 (e.g. all at 1 MHz), there are variations between individual crystals used in each oscillator and as a result of this they all run at slightly different rates. To deal with this frequency variation and resultant drift, when an STA 104 receives a beacon frame, the time stamp field is extracted by a decoding block (not shown in FIG. 1) within the STA. The time stamp field comprises the counter value of the counter 120 at the access point 102. This counter value is then copied to the counter 120 in the receiving STA 104 and overwrites the current value of the counter 120. Consequently, each time a beacon frame is received, the counter 120 at the receiving STA 104 is resynchronized to the value of the counter 120 at the AP 102. This synchronization of the counter 120 at the receiving STA 104 based on the received time stamp may be described as resynchronization or resetting of the clock. The maximum drift between the clock at an STA 104 and the clock at the AP 102 is therefore defined by the difference in tick rate between the two LCOs 118 (e.g. as a result in physical differences of the crystals), the accuracy of the time stamp (typically in microseconds) and the time between beacon frames (typically 100 ms, although it may range from 100 ms up to 1023 ms).

UK Patent GB2494949 also describes two different techniques that may be used to improve the synchronization between the transmitting wireless station and the receiving wireless station. In the first technique, prior to overwriting the value of the counter 120 in the receiving STA 104, an error between the received counter value and the current value of the counter 120 is calculated. This error can then be used to adjust the rate of the counter 120 (i.e. such that there is not necessarily a fixed relationship between a tick of the LCO and an increment of the counter). For example, through knowledge of the time elapsed since a previous correction (e.g. in response to receiving the previous beacon frame), the amount of drift between the AP counter and the STA counter can be determined. A rate adjustment unit (which may be implemented using a phase locked loop) may then be used to increment the STA counter at a rate much closer to the rate of the AP counter. By repeating this drift determination and adjustment of the rate adjustment unit each time a new time stamp is received, the error tends towards a minimum value over a short period of time. In the second technique described in UK Patent GB2494949, the STA clock 114 stores a pair of values corresponding to the received counter value and the current value of the STA counter each time a new time stamp is received. Then, instead of rate controlling the STA counter (as in the first technique), the stored pairs of values may be used by higher software layers within the STA to monitor the drift and compensate the STA counter value.

Figure 2:
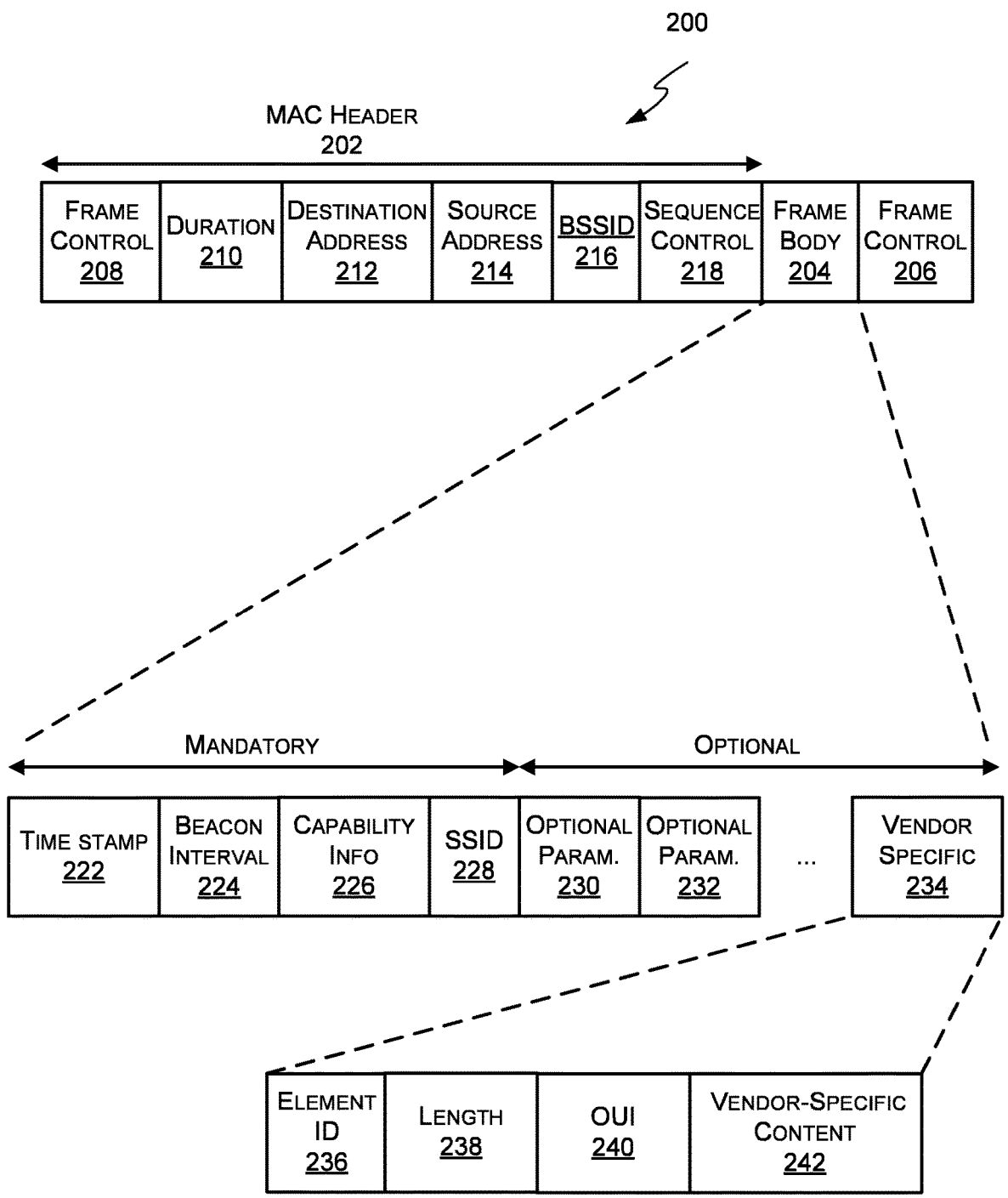
FIG. 2 shows a schematic diagram of the format of an example beacon frame.

FIG. 2 shows a schematic diagram of the format of an example beacon frame 200. In this example, the beacon frame is as defined by the Wi-Fi™ standard, although as described above, the methods described herein are not limited to use with Wi-Fi™ and may be used with other wireless standards. The beacon frame 200 shown is an example of an IEEE 802.11 management frame and to ensure that all access points and stations in a Wi-Fi™ network can properly identify management frames they have a standard frame format shown in the upper part of FIG. 2, with different management frames having a different format for the frame body portion 204, which is shown in more detail for a beacon frame in the lower part of FIG. 2.

The part of the beacon frame 200 which is common to all management frames comprises a MAC (Media Access Control) header portion 202, a frame body portion 204, and a frame control portion 206. The MAC header portion 202 comprises a frame control field 208, a duration field 210, a destination address field 212, a source address field 214, a Basic Service Set Identification (BSSID) field 216, and a sequence control field 218. As is known to those of skill in the art a single access point together with all associated stations is called a Basis Service Set (BSS). The access point acts as master to the stations within that BSS. Each BSS is identified by a BSSID. In an infrastructure BSS, the BSSID is the MAC address of the access point.

According to the IEEE 802.11 standard, the frame body portion 204 of a beacon frame comprises a time stamp field 222, a beacon interval field 224, a capability information field 226, and an SSID field 228.

The time stamp field 222 comprises the value of the timing synchronization function (TSF) time of the device that transmitted the beacon frame. As described above with reference to FIG. 1, after receiving a beacon frame, a STA 104 changes their local clock 114 to this time.

The beacon interval field 224 comprises the time interval between beacon frame transmissions of the transmitting device expressed in time units (TUs).

The capability field 226 comprises the information about the capability of the network and/or device. It may include information, such as, but not limited to, the mode of operation (ad hoc or infrastructure), support for polling, encryption etc.

The SSID information element 228 specifies the SSID or SSIDs used by the transmitting device. As is known to those of skill in the art an SSID is a sequence of alphanumeric characters (letter or numbers) that uniquely defines a Wi-Fi™ network. All access points and stations attempting to connect to a specific Wi-Fi™ network use the same SSID.

The frame body 204 of a beacon frame may optionally also comprise one or more optional fields 230, 232, 234. Optional fields may comprise, but are not limited to, a supported rates field, a frequency-hopping (FH) parameter set field, a direct-sequence (DS) parameter set field, a contention-free (CF) parameter set field, an IBSS parameter set field, a traffic indication map (TIM) field, and a vendor specific field 234.

The vendor-specific field 234 may be used to carry information not defined in the IEEE 802.11 standards and may have the format shown in FIG. 2 in which it comprises an element ID sub-field 236, a length sub-field 238, an Organizational Unique Identifier (OUI) sub-field 240, and a vendor-specific content sub-field 242. The element ID sub-field 236 identifies the specific type of field (e.g. it identifies the field 234 as a vendor specific field). The element IDs are defined in the IEEE 802.11 standards. The length sub-field 238 specifies the length of the field. The OUI sub-field 240 includes a set of alphanumeric characters that uniquely identifies a vendor. The IEEE assigns OUIs to vendors. The OUI is sometimes referred to as the vendor ID. The vendor-specific content sub-filed 242 may contain any content and is only limited by the maximum frame size.

The IEEE 802.11 standards specify the order in which the optional fields are to be placed in the frame body 204. In particular, the IEEE 802.11 standards specify that the vendor specific field 234 is to be the last field in the frame body 204 of a beacon frame.

As described above, the beacon frame format shown in FIG. 2 is by way of example only and the methods described herein may use any beacon frame format which comprises a time stamp field 222 and a vendor specific field 234 (where this vendor specific field may have any format). Similarly, the methods described herein may be used in systems where the time stamp is communicated in frames which are not beacon frames, where such frames comprise a time stamp field and a vendor specific field.

In known systems, the time stamp field 222 within a beacon frame is a 64 bit number (i.e. a number modulo $2^{64}$) which is generated by an AP based on a 1 MHz clock which ticks every microsecond. Referring back to FIG. 1, the 64 bit number corresponds to a value of the counter 120 in the clock 116 at the AP 102, with the LCO 118 operating at 1 MHz. The size of the time stamp field 222 (e.g. as defined in the Wi-Fi™ standard) limits the resolution with which a time stamp can be generated and shared within a wireless network and this in turn affects the accuracy of time synchronization within the wireless network.

Figure 3:
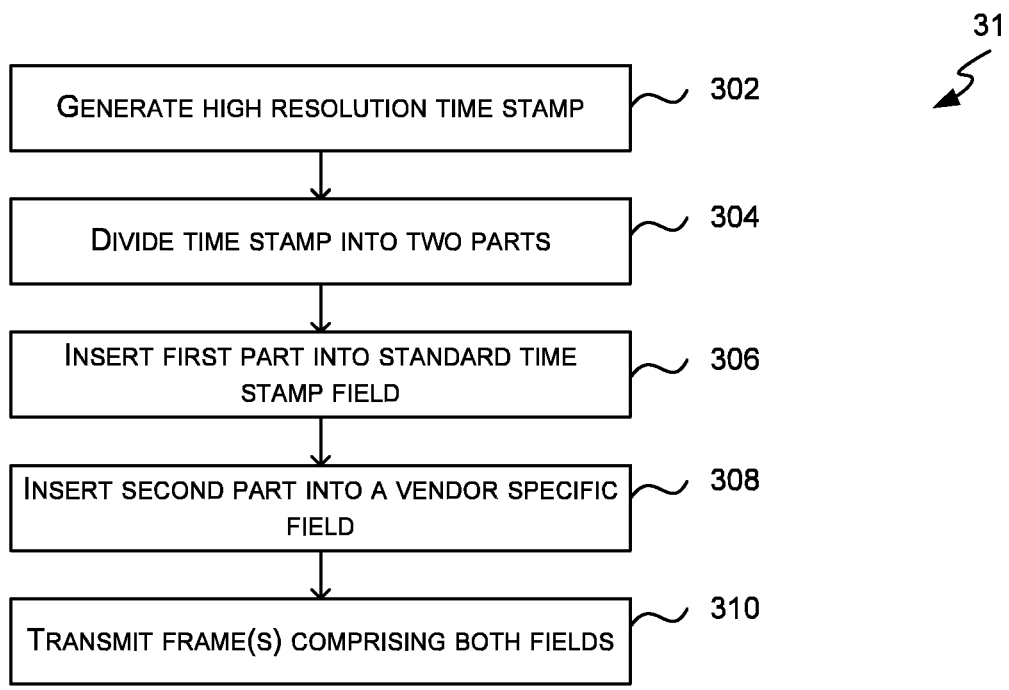
FIG. 3 shows a flow diagram of an example method of operation of a wireless station which generates the time stamps within the wireless network and a schematic diagram of an example wireless station which may implement the method.
Figure 3:
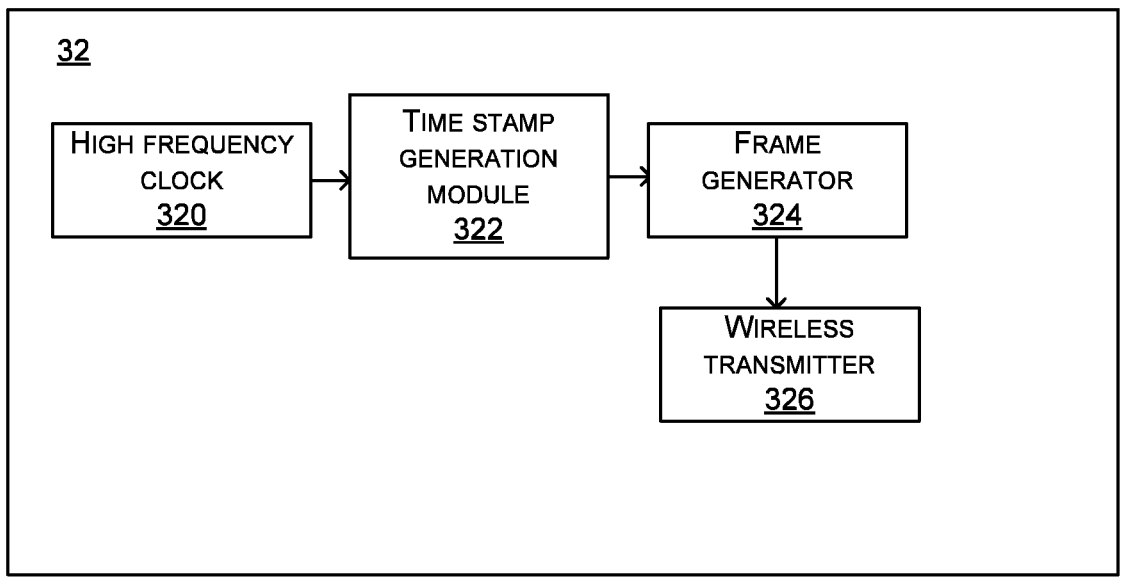
Figure 5:
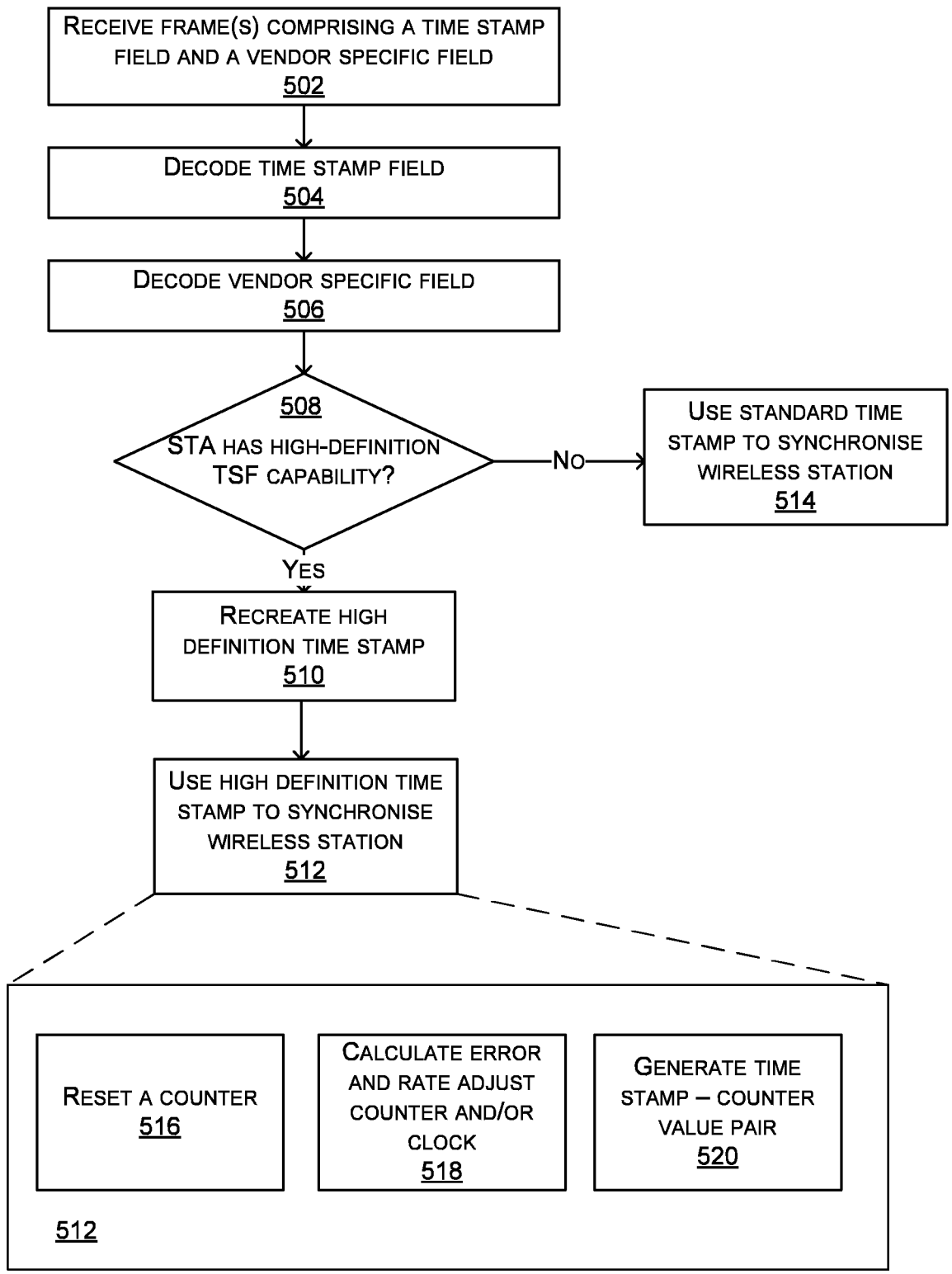
FIG. 5 is a flow diagram of an example method of operation of a wireless station within the network that receives frames which include the time stamp.

FIGS. 3 and 5 shows flow diagrams of an example method of improving the accuracy of time synchronization within a wireless network. FIG. 3 comprises a flow diagram 31 which shows the method of operation of a wireless station which generates the time stamps within the wireless network (e.g. an AP) and FIG. 5 comprises a flow diagram which shows an example method of operation of a wireless station within the network that receives frames which include the time stamp. These methods may, for example, be implemented in the network 100 shown in FIG. 1, although as described in more detail below, in order to implement the methods, the wireless stations comprise a clock that operates at a higher frequency than normal (e.g. at a frequency greater than 1 MHz and in various examples, many orders of magnitude greater than 1 MHz). The clock which operates at a higher frequency than normal within these wireless stations may be the physical layer clock 114 shown in FIG. 1 or alternatively may be a system clock, which may also be referred to as a common event clock, and which may run at 400 MHz or more. The system clock may, for example, be implemented as a software control loop within a system on chip (SoC). The system clock may have its own counter, which is separate from the physical layer counter 120 and increments at the faster rate.

Figure 6:
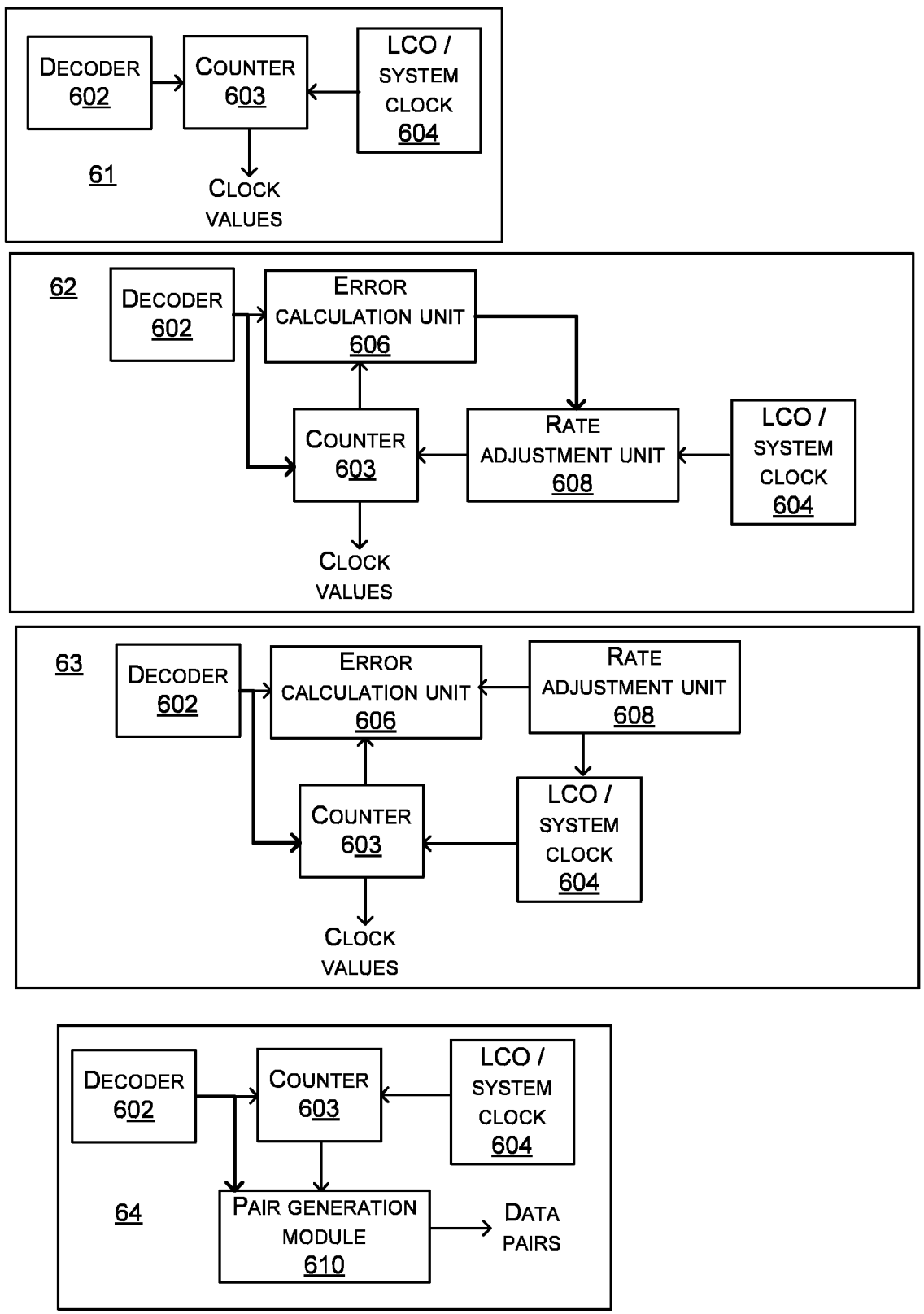
FIG. 6 shows schematic diagrams of parts of example wireless stations in which the method shown in FIG. 5 may be implemented.

FIG. 3 also shows a schematic diagram of parts of a wireless station 32 in which the method of FIG. 3 may be implemented and FIG. 6 shows schematic diagrams of the parts of example wireless stations in which the method of FIG. 5 may be implemented.

Figure 4:
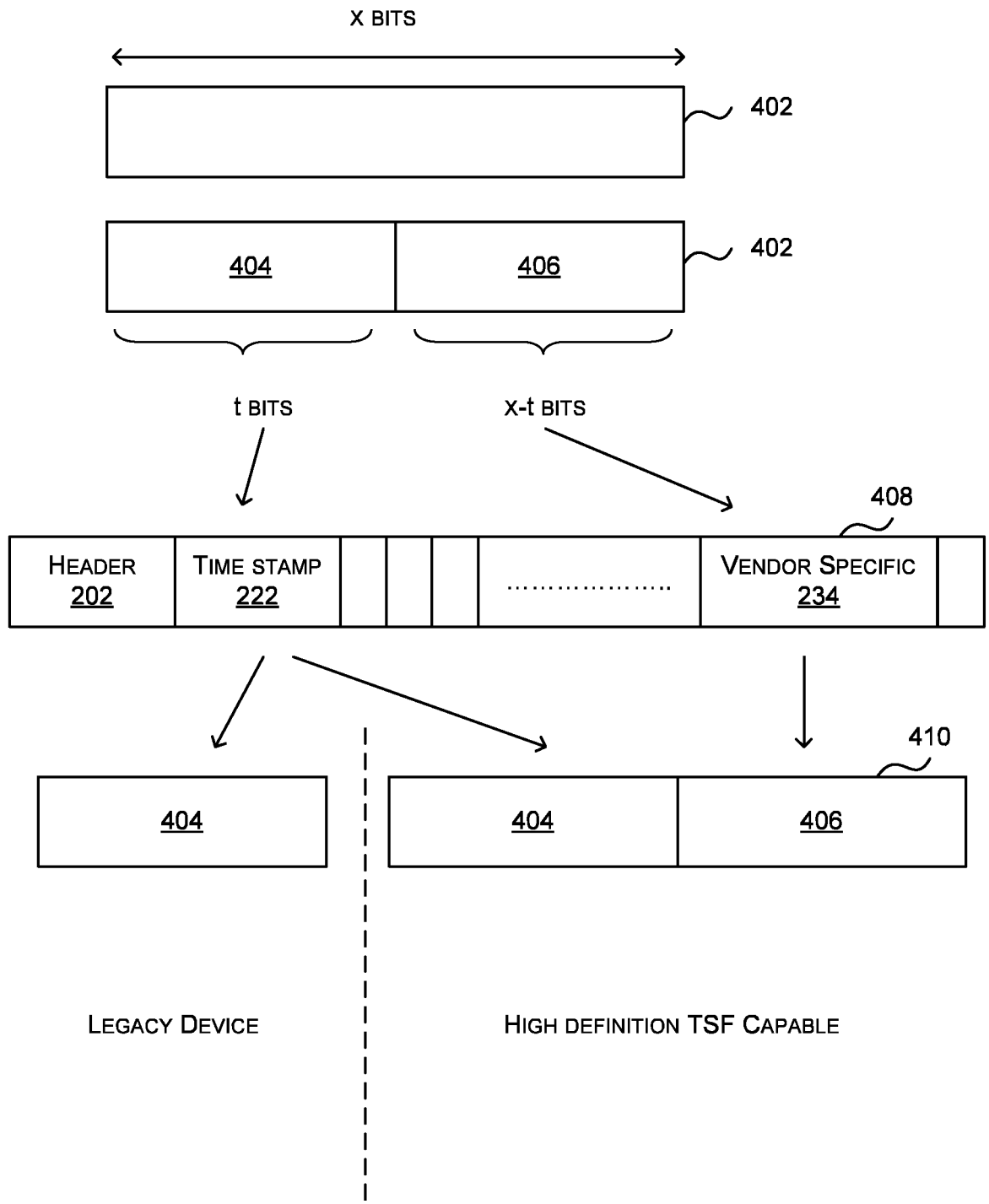
FIG. 4 shows a generated high definition time stamp.

A high resolution time stamp is generated (block 302) by a wireless station that is responsible for generating and sharing time stamps within the network (e.g. an AP). For example, instead of using a 1 MHz LCO in the AP 102 (as in known systems), an oscillator is used which ticks at a much faster rate (e.g. high frequency clock 320), e.g. it may tick every nanosecond (e.g. a 1 GHz LCO) or every picosecond (e.g. a 1 THz LCO). The counter value (and hence time stamp) that is generated by this faster LCO (in block 302) is larger than the size of the standard time stamp field (t bits) and this is shown in FIG. 4. FIG. 4 shows a generated time stamp 402 comprising x bits, where x is larger than the number of bits in the standard time stamp field within the wireless network 100 (i.e. x>t). Where this is a Wi-Fi™ network, the standard time stamp field comprises 64 bits (t=64) and so x>64. In various examples, the counter value generated may comprise a 74 bit number (for the nanosecond example) or 84 bit number (for the picosecond example), e.g. x=74 or x=84. In other examples, x may have a different value. In other examples, the time stamp field 222 within the beacon frame may represent a number which contains more or fewer than 64 bits (i.e. t may have a value which is not equal to 64) and the tick rate of the clock which generates it may be different (i.e. a rate which is not 1 MHz). However, in all cases, the time stamp field 222 has a defined size (e.g. as defined by a standard) which limits the resolution with which the time stamp can be transmitted to wireless stations 104 within a wireless network 100.

Having generated a high resolution time stamp (in block 302), the generated time stamp is divided into two parts (block 304). The first part 404 comprises the same number of bits as the standard time stamp field used within the wireless network, t bits. The second part 406 comprises the remaining bits, x-t bits. In various examples, the first part 404 comprises the t most significant bits in the generated high resolution time stamp and the second part 406 comprises the x-t least significant bits in the generated high resolution time stamp 302, such that all bits from the generated high resolution time stamp 402 are within one (and only one) of the two parts 404, 406. In an example, t=64.

The first part is then inserted into the standard time stamp field in a frame (block 306) and the second part is inserted into a vendor specific field in a frame (block 308). The frame(s) are then broadcast by the wireless station (block 310). In various examples the first and second parts are inserted into the standard time stamp field and a vendor specific field in the same frame. In other examples, however, the two parts may be inserted into different frames and the two parts may be correlated by a receiving wireless station based on a sequence number, ID tag or other identifier.

Where the frame is a Wi-Fi™ beacon frame 408 (e.g. as shown in FIG. 2 and described above), the first part is inserted into the time stamp field 222 and the second part is inserted into the vendor-specific content field 242 within the vendor specific field 234.

The generation and splitting of the time stamp (in blocks 302-304) may be implemented within a time stamp generation module 322 and a frame generator module 324 may insert the parts of the time stamp into the time stamp and vendor specific fields of one or two frames (in blocks 306-308), before the frames are transmitted (in block 310) by a wireless transmitter 326. In various examples, the time stamp generation module 322 and the frame generator module 324 may both be implemented within a media access controller module within the wireless station (e.g. a Wi-Fi™ MAC).

As shown in FIG. 5, a receiving wireless station receives the transmitted frame (block 502) and decodes the time stamp field 222 (block 504) and the vendor specific field 234 (block 506). If the receiving wireless station can interpret the second part of the time stamp in the vendor specific field ('Yes' in block 508), the wireless station recreates the full time stamp 410 (block 510) and then uses the high definition time stamp to synchronize the wireless station to the wireless station that transmitted the frame received in block 502 (block 512). If, however, the receiving wireless station is unable to interpret the second part of the time stamp in the vendor specific field ('No' in block 508), the wireless station uses only the information from the time stamp field 222 to synchronize the wireless station to the wireless station that transmitted the frame received in block 502 (block 514) and this may, for example, be implemented by resetting a local counter which may be incrementing based on the tick of an LCO running at the standard frequency (e.g. 1 MHz) to the value from the time stamp field.

As shown in FIG. 5, there are many different ways in which the high definition time stamp may be used in synchronizing the wireless station and in various examples, one or more of the following techniques may be used:
  resetting a counter (block 516);
  calculating an error and adjusting the rate of a counter or clock (block 518); and
  generating a time stamp-counter value pair (block 520).

In examples, where the high definition time stamp is used to reset a counter (in block 516), this may be a counter which increments based on an LCO which runs at same faster rate as the transmitting station (or at any rate which is faster than the standard rate) or the counter which increments based on the system clock. The first diagram in FIG. 6 shows an example wireless station 61 comprising a decoder 602 which decodes the time stamp and vendor specific fields and recreates the high definition time stamp (blocks 506, 508, 510) and a counter 603 which increments at the tick rate of a LCO/system clock 604.

Figure 7:
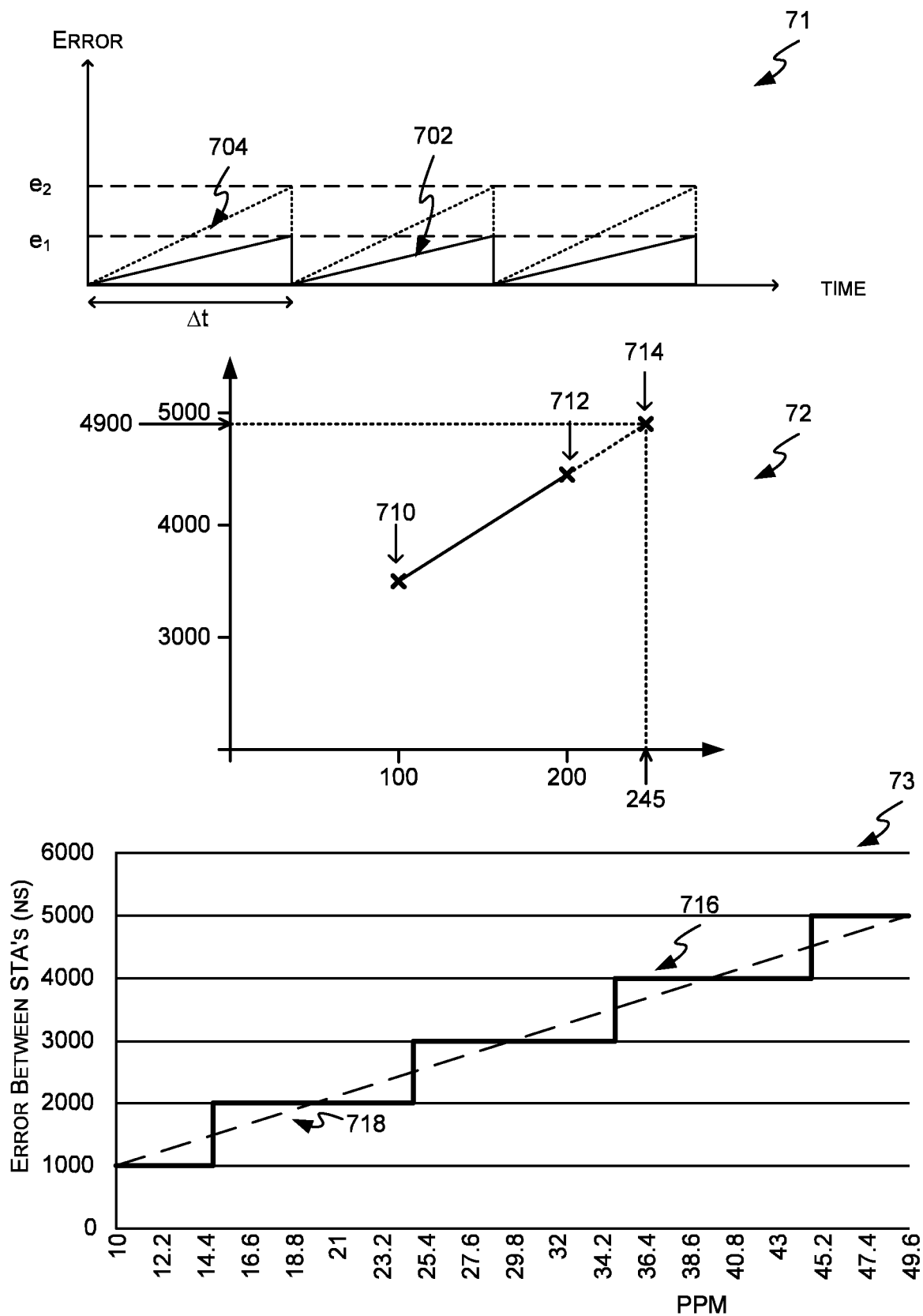
FIG. 7 shows three graphs demonstrating the improvement in synchronization accuracy which may be achieved using the methods described herein.

By resetting a counter (in block 516) as shown in FIG. 5, the maximum drift between the clock at an STA 104 and the clock at the AP 102 is reduced because of the increased resolution of the time stamp, as shown in the first graph 71 in FIG. 7, even where the frames comprising the time stamps (e.g. beacon frames) are transmitted at the time interval, $\Delta t$. The first graph 71 in FIG. 7 shows the error drift where the high resolution time stamp is used (line 702) compared to the error drift where a standard time stamp is used (line 704) and the maximum error for the high resolution time stamp, $e_1$ is less than where the standard time stamp is used, $e_2$.

As described above, in various examples the high definition time stamp may be used to adjust the rate of a counter (in block 518) and in many examples this may be used in combination with resetting a counter (in block 516) as described below; however it may also be used where the counter is not reset. The second diagram in FIG. 6 shows an example wireless station 62 comprising a decoder 602 which decodes the time stamp and vendor specific fields and recreates the high definition time stamp (blocks 506, 508, 510). Prior to resetting the local counter 603 (in block 516) based on the time stamp, an error is calculated (in error calculation module 606) between the high definition time stamp and the current counter value at the wireless station 62. This error value is fed to a rate adjustment unit 608 (which may be implemented using a phase locked loop) and used to increment the counter 603 at a rate much closer to the rate of the AP counter. By repeating this each time a new time stamp is received, the error tends towards a minimum value over a short period of time and by using a higher resolution time stamp, the minimum value is smaller than when only using the standard time stamp and the jitter in the system is reduced. The counter 603 which is rate adjusted may be the counter which increments based on an LCO or the counter which increments based on the system clock.

In examples where the counter 603 increments at a rate slower than the rate of the LCO at the AP, the resetting of the local counter 603 (in block 516) may use only the standard time stamp (even where the STA has high-definition TSF capability) or may use more bits than the standard time stamp but fewer bits than are in the high definition time stamp (e.g. one or more of the least significant bits may be discarded and not used in resetting the local counter 603).

Instead of using the high definition time stamp to adjust the rate of a counter, the high definition time stamp may be used adjust the rate of a clock (in block 518). The third diagram in FIG. 6 shows an example wireless station 63 comprising a decoder 602 which decodes the time stamp and vendor specific fields and recreates the high definition time stamp (blocks 506, 508, 510). Prior to resetting the local counter 603 (in block 516) based on the time stamp, an error is calculated (in error calculation module 606) between the high definition time stamp and the current counter value at the wireless station 62. This error value is then used (by rate adjustment unit 608) to adjust the rate of the clock 604 (in block 518). By repeating this each time a new time stamp is received, the error tends towards a minimum value over a short period of time and by using a higher resolution time stamp, the minimum value is smaller than when only using the standard time stamp and the jitter in the system is reduced. The clock 604 which is rate adjusted may be an LCO or the system clock.

As shown in FIG. 5 and the fourth diagram in FIG. 6, in some examples, the high definition time stamp (generated in block 510 and decoder 602) may be used to generate a pair of values corresponding to the high definition time stamp and a local counter value (block 520, e.g. by pair generation module 610). These pairs of values may be used by higher software layers within the STA to extrapolate from the identified data points (i.e. the value pairs) to calculate a value of the time stamp at a particular value of the local counter. By using pairs of values in this way, which may be stored until they are required, the method is not adversely affected if there is a delay in the processing of the pairs of values by the higher software layers (e.g. by an application running on the wireless station). As in previous examples, the counter 603 which is rate adjusted may be the counter which increments based on an LCO or the counter which increments based on the system clock.

By using a LCO/system clock 604 with a higher frequency than the standard 1 MHz clock and a more accurate time stamp value, the extrapolated value of the time stamp which is calculated using the stored value pairs is more accurate, as shown in the second and third graphs 72, 73 in FIG. 7.

The second graph 72 in FIG. 7 shows time stamp values on the x-axis and system clock values on the y-axis. Two stored value pairs (indicated by arrows 710, 712) are shown on the graph. If the value of the system clock when the higher software layers are ready to process data is 4900, the two stored value pairs can be used to predict the actual time stamp value, indicated by arrow 714 (245 in this example). By using higher definition (i.e. higher precision) time stamp values using the methods described herein, the extrapolated time stamp value (e.g. 245) is more accurate and this is shown in the third graph 73 in FIG. 7. This graph 73 shows that where a microsecond time stamp is used, the error can only be represented in steps of 1 μs (line 716); however the error can be more accurately represented where a higher definition time stamp is used (as indicated by line 718). On this graph 73, the x-axis shows the part per million (PPM) error of the clocks in the two stations which results in the synchronization error (in ns) shown on the y-axis.

According to the method shown in FIG. 5, each wireless station decodes the vendor specific field (in block 506) irrespective of whether they have the ability to interpret the second part of the time stamp. In other examples, which are variations of that shown in FIG. 5, the vendor specific field may only be decoded (in block 506) if the wireless station has the capability to interpret the second part of the time stamp (i.e. such that block 506 is after the decision point in block 508 and before block 510 rather than being before block 508).

In the methods as described above, the high resolution time stamp is generated and transmitted by a wireless station within the network based on a clock in that wireless station. In various examples, however, the wireless station which transmits the time stamp to other wireless stations may generate the time stamp based on an external time source. For example, an AP may generate the time stamp based on an external time server using a protocol such as NTP. The methods described above may also be used where the time stamp is generated based on an external time source and in such examples, the time stamp is generated at a higher resolution than can fit within the time stamp field based on the external time source.

The resolution of a time stamp used within a wireless network (such as network 100 in FIG. 1) may be fixed or may be variable (e.g. such that the resolution is tailored to particular requirements of the system/application). Referring back to FIG. 4, in all cases, x bits are inserted into the time stamp field in order to comply with the standard and where the resolution used is fixed, x-t bits are always inserted into the vendor specific field. Where the resolution is varied, the number of bits inserted into the vendor specific field is varied. This may involve varying the resolution with which the time stamp is generated (e.g. varying the value of x) or using a fixed resolution for the generation of the time stamp (e.g. x is fixed) and discarding one or more of the least significant bits of the generated time stamp. Both of these examples are shown graphically in FIG. 8.

In the first example, the generated time stamp 802 comprises a variable number of bits, x' and these bits are divided into two parts—a first part 804 comprising the t most significant bits (where t is fixed) and the second part 806 comprising the remaining x'-t bits. In contrast, in the second example, the generated time stamp 812 always comprises the same number, x'', of bits, but where the full resolution is not required, one or more least significant bits are discarded (y bits, where y≥0). The remaining x''-y bits are divided into two parts—a first part 814 comprising the t most significant bits (where t is fixed) and the second part 816 comprising the remaining x''-y-t bits. As described above, the first part 804, 814 is inserted into the time stamp field of a frame and the second part 806, 816 is inserted into the vendor specific field of the same frame. Both examples achieve the same effect, i.e. x'-t=x''-y-t.

Figure 8:
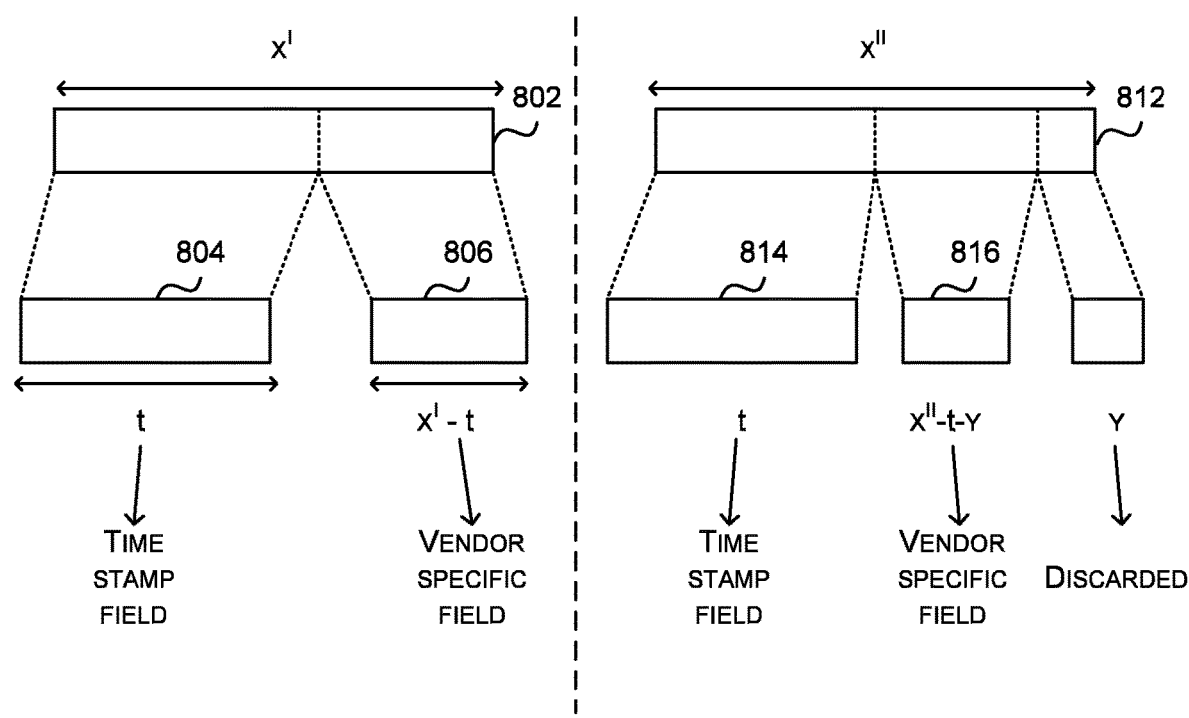
FIG. 8 shows further generated high definition time stamps.
Figure 9:
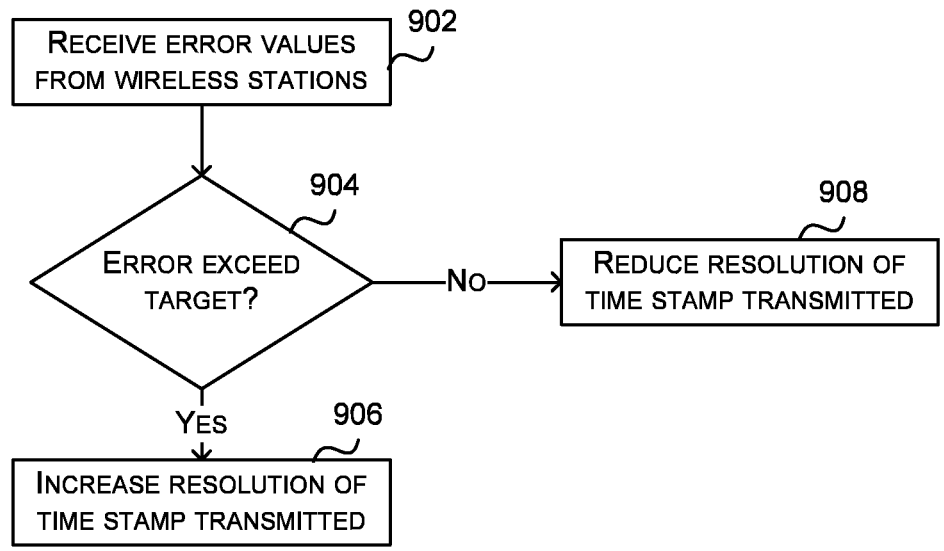
FIG. 9 is a flow diagram of a method of operation of a wireless station.

As the creation of the time stamp will take CPU time, scaling the resolution of the time stamp which is generated (as in the first example in FIG. 8) to requirements of the system/application may be more efficient than discarding bits prior to transmission (as in the second example in FIG. 8.

Where the resolution used is varied, this may be done for any reason and in various examples it may be varied based on feedback provided by the receiving wireless stations to the wireless station that is broadcasting the time stamp. In an example, each wireless station may determine the difference between the received time stamp and the local clock value when a new time stamp is received (this is shown as error $e_1$ in FIG. 5 and in various examples may be determined in the error calculation unit 606 or pair generation module 610 or based on a pair generated by the pair generation module 610) and communicate this to the broadcasting wireless station (e.g. within another management frame, such as a probe request frame). The broadcasting wireless station (e.g. the AP) may then operate as shown in FIG. 9. In response to receiving the error values from wireless stations (block 902), the received values are compared to a target value (block 904). This target may, for example, be an average value for all wireless stations or a maximum value for any one wireless station. In various examples, the target may be defined as a range. If the target error is exceeded ('Yes' in block 904), the resolution which is used is increased (block 906) and if the target error is not exceeded ('No' in block 904), the resolution which is used is decreased (block 908). In various examples, the resolution may be varied (in blocks 906 and 908) between an upper limit (e.g. where y=0) and a lower limit and in various examples the lower limit may be the standard resolution (e.g. such that x'=t).

Figure 10:
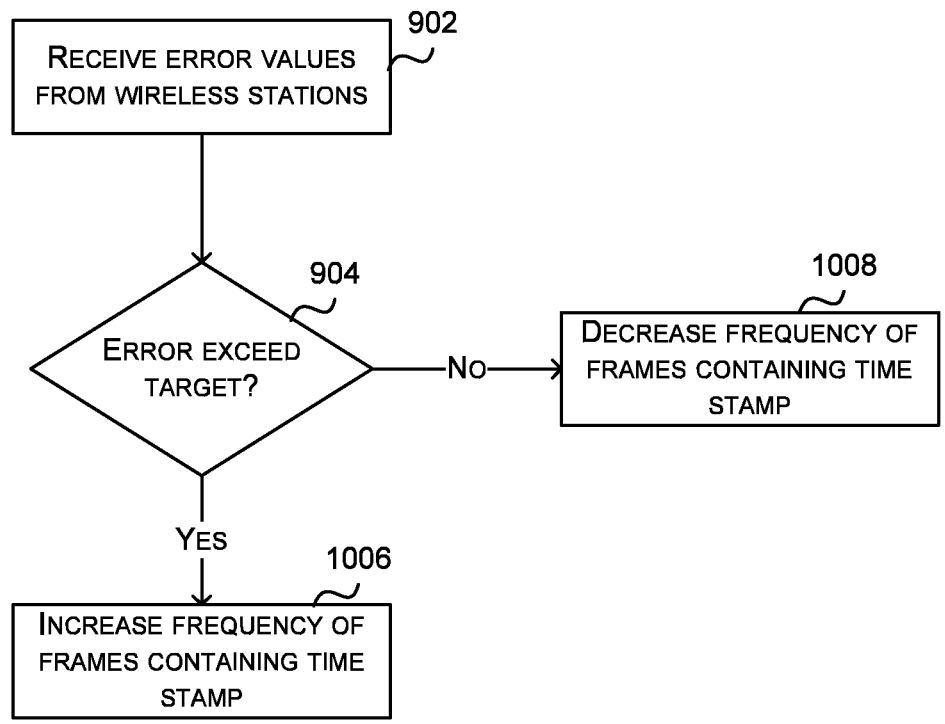
FIG. 10 is a flow diagram of another method of operation of a wireless station.

In addition to, or instead of, varying the resolution of the time stamp which is transmitted, the error may be controlled by varying the frequency with which time stamps are broadcast, as shown in FIG. 10. As described above with reference to FIG. 2, the interval that is used may be communicated by a broadcasting wireless station (e.g. an AP) to other wireless stations in a wireless network as part of the beacon frame (e.g. in the beacon interval field 224). In response to receiving the error values from wireless stations (block 902), the received values are compared to a target value (block 904). As described above, this target may be defined in many ways and may be a range of values. If the target error is exceeded ('Yes' in block 904), the frequency of transmission of frames comprising a time stamp is increased (block 1006), and hence the interval between frames is reduced. If the target error is not exceeded ('No' in block 904), the frequency of transmission of frames comprising a time stamp is decreased (block 1008), and hence the interval between frames is increased. This enables the broadcasting wireless station (e.g. the AP) to tailor the rate of the frames comprising the time stamp (e.g. the beacon frames) to meet an error target, whilst not wasting bandwidth by sending beacon frames unnecessarily frequently.

Where a wireless station communicates an error value to the broadcasting wireless station, this error may be sent in any way. Where it is included within a probe request frame, the frame may be included within a vendor specific field. As described above, all Wi-Fi™ management frames have the same structure, as shown in the upper part of FIG. 2, but a different format within the frame body 204. The frame body for a probe request frame includes a vendor specific field in a similar manner to the beacon frame shown in FIG. 2.

Figure 11:
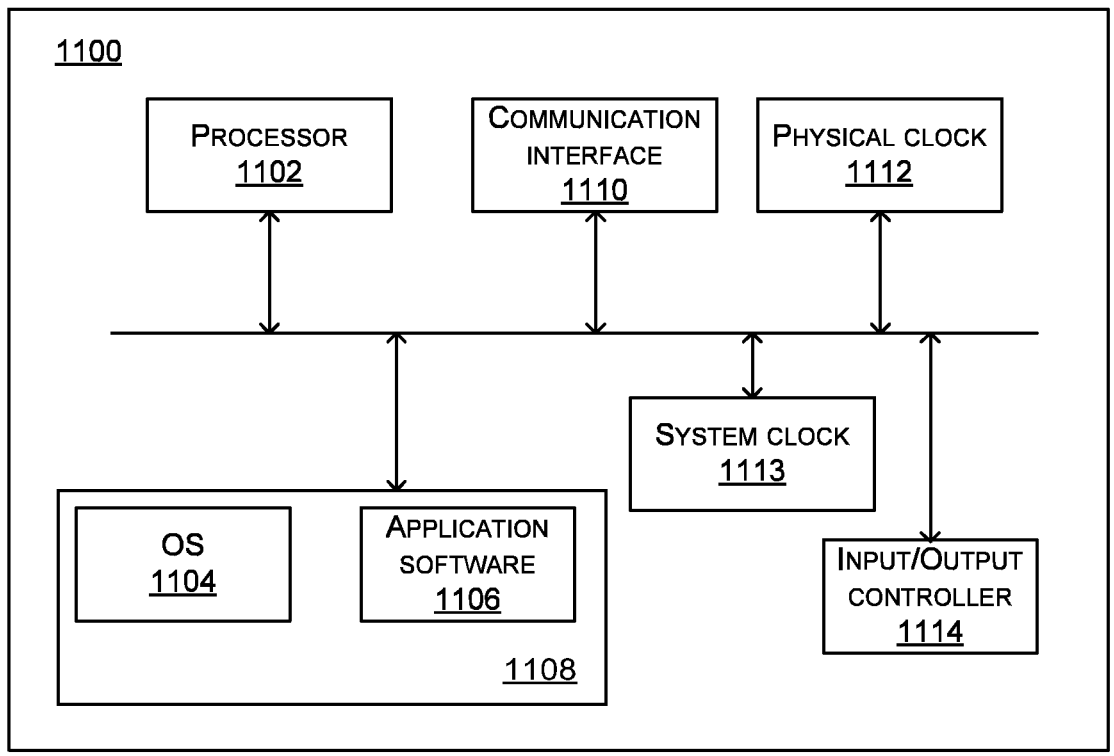
FIG. 11 illustrates various components of an exemplary computing-based device which may operate as a wireless station.

FIG. 11 illustrates various components of an exemplary computing-based device 1100 which may be implemented as any form of a computing and/or electronic device, and which may operate as a wireless station. The wireless station may act as an AP and generate time stamps or may receive time stamps and use them to synchronize the local clock.

Computing-based device 1100 comprises one or more processors 1102 which may be microprocessors, controllers or any other suitable type of processors for processing computer executable instructions to control the operation of the device in order to operate as a wireless station. In some examples, for example where a system on a chip architecture is used, the processors 1100 may include one or more fixed function blocks (also referred to as accelerators) which implement a part of the method of operation in hardware (rather than software or firmware), e.g. the splitting of the time stamp in a transmitting wireless station or the recreation of the high definition time stamp in a receiving wireless station. Platform software comprising an operating system 1104 or any other suitable platform software may be provided at the computing-based device to enable application software 1106 to be executed on the device. This application software may, for example, comprise a module that adjust the resolution of the time stamp transmitted and/or the frame rate used (e.g. as described above with reference to FIGS. 9 and 10), modules which divide the time stamp (e.g. time stamp generation module 322) and insert the parts into a frame for transmission (e.g. frame generator module 324), a module which decodes the received time stamp (e.g. decoder 602), a module which tracks the error in the clock 1112 (e.g. error calculation unit 606) and/or generates time stamp-clock value pairs (e.g. pair generation module 610), etc. Alternatively, some or all of these modules may be implemented in hardware within the computing-based device 1100.

The computer executable instructions may be provided using any computer-readable media that is accessible by computing-based device 1100. Computer-readable media may include, for example, computer storage media such as memory 1108 and communications media. Computer storage media (i.e. non-transitory machine readable media), such as memory 1108, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1108) is shown within the computing-based device 1100 it will be appreciated that the storage may be distributed or located remotely and accessed via a network or other communication link (e.g. using communication interface 1110). Where the computing-based device 1100 is a receiving wireless station, the memory 1108 may be used to store time stamp-clock value pairs which may subsequently be used by application software 1106 to extrapolate and calculate new time stamp values corresponding to a particular clock value, where the clock value may be the value of the physical layer clock 1112 or the system clock 1113.

The communication interface 1110 is arranged to transmit frames comprising time stamps, where the computing based device 1100 operates as an AP, and to receive frames comprising time stamps, where the computing based device 1100 does not operate as an AP.

The computing-based device 1100 may comprise one or more clocks, such as a physical layer clock 1112 and/or a system clock 1113. Each of these clocks may comprise a counter and as where the computing-based device is a wireless station which receives frames comprising a time stamp via the communication interface 1110, either or both of these counters may be reset and/or rate adjusted based on a high definition time stamp received (as described above with reference to FIG. 5).

The computing-based device 1100 may also comprise an input/output controller 1114 arranged to output display information to a display device (which may be separate from or integral to the computing-based device) and to receive and process input from one or more devices, such as a user input device (e.g. a mouse or a keyboard), etc.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A wireless station comprising:
   a clock operating at a frequency above 1 MHz;
   a time stamp generation module arranged to generate a high resolution time stamp using the clock and to divide the generated time stamp into two parts, the first part comprising a time stamp at a lower resolution than the generated time stamp and the second part comprising one or more remaining bits of the generated time stamp;
   a frame generator module arranged to insert the first part into a time stamp field within a frame and the second part into a vendor specific field within a frame; and
   a wireless transmitter arranged to transmit the one or two frames comprising the time stamp field and the vendor specific field.

2. The wireless station according to claim 1, wherein the frame generator module is arranged to insert the first part into a time stamp field within a frame and the second part into a vendor specific field within the same frame.

3. The wireless station according to claim 1, wherein the first part comprises a plurality of most significant bits from the generated time stamp.

4. The wireless station according to claim 3, wherein the first part comprises the 64 most significant bits from the generated time stamp.

5. The wireless station according to claim 1, further comprising:
   an adjustment module arranged to receive one or more error values from other wireless stations, each error value indicating a difference between a received time stamp and a clock value at the other wireless station when the time stamp was received, to compare the received error values to an error target and in response to determining that the error target has been exceeded, to increase a resolution of the generated time stamp.

6. The wireless station according to claim 1, further comprising:
   an adjustment module arranged to receive one or more error values from other wireless stations, each error value indicating a difference between a received time stamp and a clock value at the other wireless station when the time stamp was received, to compare the received error values to an error target and in response to determining that the error target has been exceeded, to increase a number of bits in the second part.

7. The wireless station according to claim 1, further comprising:
   an adjustment module arranged to receive one or more error values from other wireless stations, each error value indicating a difference between a received time stamp and a clock value at the other wireless station when the time stamp was received, to compare the received error values to an error target and in response to determining that the error target has been exceeded, to increase a frequency of transmission of frames comprising the time stamp field and the vendor specific field.

8. The wireless station according to claim 1, wherein the frame is a beacon frame.

9. The wireless station according to claim 1, wherein the wireless station is an access point.

10. The wireless station according to claim 1, wherein the wireless station is a Wi-Fi™ station.

11. A computer readable storage medium having stored thereon a computer readable dataset description of an integrated circuit that, when processed in an integrated circuit manufacturing system, causes the integrated circuit manufacturing system to manufacture a processor comprising:
- a time stamp generation module arranged to generate a high resolution time stamp using the clock and to divide the generated time stamp into two parts, the first part comprising a time stamp at a lower resolution than the generated time stamp and the second part comprising one or more remaining bits of the generated time stamp; and
- a frame generator module arranged to insert the first part into a time stamp field within a frame and the second part into a vendor specific field within a frame.

12. The computer readable storage medium according to claim 11, wherein the frame generator module is arranged to insert the first part into a time stamp field within a frame and the second part into a vendor specific field within the same frame.

13. The computer readable storage medium according to claim 12, wherein the first part comprises a plurality of most significant bits from the generated time stamp.

14. The computer readable storage medium according to claim 13, wherein the first part comprises the 64 most significant bits from the generated time stamp.

15. The computer readable storage medium according to claim 11, wherein the processor further comprises one of:
- a first adjustment module arranged to receive one or more error values from other wireless stations, each error value indicating a difference between a received time stamp and a clock value at the other wireless station when the time stamp was received, to compare the received error values to an error target and in response to determining that the error target has been exceeded, to increase a resolution of the generated time stamp;
- a second adjustment module arranged to receive one or more error values from other wireless stations, each error value indicating a difference between a received time stamp and a clock value at the other wireless station when the time stamp was received, to compare the received error values to an error target and in response to determining that the error target has been exceeded, to increase a number of bits in the second part; and
- a third adjustment module arranged to receive one or more error values from other wireless stations, each error value indicating a difference between a received time stamp and a clock value at the other wireless station when the time stamp was received, to compare the received error values to an error target and in response to determining that the error target has been exceeded, to increase a frequency of transmission of frames comprising the time stamp field and the vendor specific field.

16. A computer readable storage medium having stored thereon a computer readable dataset description of an integrated circuit that, when processed in an integrated circuit manufacturing system, causes the integrated circuit manufacturing system to manufacture a processor comprising:
- a decoder arranged to decode a time stamp field of a received frame to extract a first part of a time stamp and a vendor specific field of a received frame to extract a second part of the time stamp and to combine the first and second parts to create a high resolution time stamp; and
- logic arranged to use the high resolution time stamp to synchronize a wireless station with other wireless stations in a wireless network.

17. The computer readable storage medium according to claim 16, wherein the logic arranged to use the high resolution time stamp to synchronize the wireless station with other wireless stations in a wireless network comprises:
- logic within the decoder arranged to reset the counter to a value of the high resolution time stamp.

18. The computer readable storage medium according to claim 16, wherein the logic arranged to use the high resolution time stamp to synchronize the wireless station with other wireless stations in a wireless network comprises:
- an error calculation unit arranged to calculate an error value between the high resolution time stamp and a current value of the counter value prior to resetting the counter; and
- a rate adjustment unit arranged to use the error value to adjust a rate at which the counter is incremented.

19. The computer readable storage medium according to claim 16, wherein the logic arranged to use the high resolution time stamp to synchronize the wireless station with other wireless stations in a wireless network comprises:
- an error calculation unit arranged to calculate an error value between the high resolution time stamp and a current value of the counter value prior to resetting the counter; and
- a rate adjustment unit arranged to use the error value to adjust a rate at which the local oscillator or system clock runs.

20. The computer readable storage medium according to claim 16, wherein the logic arranged to use the high resolution time stamp to synchronize the wireless station with other wireless stations in a wireless network comprises:
- a pair generation module arranged to generate a data pair comprising the high resolution time stamp and a current value of the counter.

* * * * *